United States Patent [19]

Saito

[11] Patent Number: 5,329,164

[45] Date of Patent: Jul. 12, 1994

[54] SAFETY CIRCUIT FOR A FUEL SUPPLY SYSTEM

[75] Inventor: Shiro Saito, Yabuzuka, Japan

[73] Assignee: Fuji Jukogyo Kabushiki Kaisha, Tokyo, Japan

[21] Appl. No.: 929,536

[22] Filed: Aug. 14, 1992

[30] Foreign Application Priority Data

Aug. 30, 1991 [JP] Japan .............................. 3-077087[U]

[51] Int. Cl.$^5$ .............................................. B60K 28/00
[52] U.S. Cl. ................... 307/10.1; 307/10.6; 361/170; 361/189; 123/198 DC
[58] Field of Search ............... 307/9.1, 10.1, 10.6; 361/160, 166, 170, 189, 191; 123/198 DC, 630

[56] References Cited

U.S. PATENT DOCUMENTS 4,815,436 3/1989 Sasaki et al. .
4,903,672 2/1990 Mac Kinnon .................... 123/520

FOREIGN PATENT DOCUMENTS 1-98023 6/1989 Japan .

OTHER PUBLICATIONS

Patent Abstracts of Japan; Group No. M370; vol. 9, No. 80, Document No. 59-209922; Apr. 10, 1985; Makoto Asou.

Primary Examiner—A. D. Pellinen
Assistant Examiner—Fritz M. Fleming
Attorney, Agent, or Firm—Beveridge, DeGrandi, Weilacher & Young

[57] ABSTRACT

In a fuel supply system for a motor vehicle wherein a solenoid valve is interposed in an air breather pipe by which fuel vaporized in a fuel tank is introduced into a canister, and the solenoid valve is opened by an ON signal of a fuel flap switch which turns ON when a fuel flap is opened, so as to bring the air breather pipe into communication from the fuel tank to the canister, thereby permitting the fuel tank to be fueled; a safety circuit for a fuel supply system of a motor vehicle comprising the fact that a solenoid valve driving circuit which extends from a power source to an earth through the fuel flap switch as well as the solenoid valve is provided with a first relay of normally-closed type to turn OFF in an ON state of a boost switch which turns ON when a stop of an engine is detected in an ON state of an ignition key switch, and that an ignition coil driving circuit which extends from the power source to the earth through the ignition key switch as well as an ignition coil is provided with a second relay of normally-closed type to turn OFF during energization of the solenoid valve driving circuit, whereby the fuel tank can be fueled only when the engine is stopped.

12 Claims, 1 Drawing Sheet

PRIOR ART

SAFETY CIRCUIT FOR A FUEL SUPPLY SYSTEM

BACKGROUND OF THE INVENTION

1. Field of the Invention

The present invention relates to a safety circuit for the fuel supply system of a motor vehicle.

2. Description of the Prior Art

In a fuel tank assembly wherein fuel vaporized in a fuel tank is introduced and collected into a canister or an intake system through an air breather pipe, there has already been developed and laid open in the official gazette of Japanese Utility Model Registration Application Laid-open No. 98023/1989 a system in which the air breather pipe is furnished with a solenoid valve, and in which, when a liquid level switch provided in the fuel tank detects the arrival of poured fuel at a prescribed level, the solenoid valve is closed, while at the same time, an alarm lamp and a buzzer are actuated, thereby to prevent excessive fueling.

Heretofore, in fueling a fuel tank mounted on a vehicle at a gasoline station, it has been requested as mere guidance to stop the engine of the vehicle in consideration of safety. No problem occurs as long as the expedient is practised that, when the driver of the vehicle asks for the fueling at the gasoline station, he/she pulls a key plate out of an ignition key switch and delivers it to an employee at the gasoline station so as to open the flap of the fuel tank. In contrast, in a case where the driver delivers a spare key plate without extracting the key plate from the ignition key switch or where the flap of the fuel tank is opened by the manipulation of a remote-control opener switch having come into wide use in recent years, there is the problem that the fueling is possible even during the rotation of the engine including the starting mode thereof, so the safety of the fueling operation cannot be secured.

SUMMARY OF THE INVENTION

An object of the present invention is to provide a safety circuit for a fuel supply system which ensures safe fueling.

According to the present invention, there is provided a safety circuit for a fuel supply system of a motor vehicle, having a canister for adsorbing a fuel vapor generated in a fuel tank mounted on said motor vehicle, an air breather pipe connected between an upper portion of said fuel tank and said canister for replacing air when fuel decreases, a fuel flap provided on said fuel tank for opening and closing to fill, a solenoid valve interposed in said air breather pipe for breathing air into said fuel tank, and a key switch connected between a power source and an ignition coil for igniting to start an engine, the improvement of the safety circuit which comprises:

a fuel flap switch connected to said fuel flap for closing thereof when said fuel flap is opened and for opening said fuel flap switch when said fuel flap is closed;

a driving circuit connected from said power source to a ground earth via said solenoid valve;

a boost switch connected between said key switch and said ground earth for closing thereof when said key switch is ON and when said engine is stopped;

a switch interposed in said driving circuit for opening thereof when said boost switch is ON; and a relay interposed between said key switch and said ignition coil for opening thereof when said solenoid valve is operated so as to improve safety fueling and to prevent said solenoid valve from burning.

The safety circuit may well further comprise a timer interposed between said fuel flap switch and said switch for closing thereof when said flap switch is ON and for opening after a predetermined time period so as to restrict an actuating time of said solenoid valve and to avoid burning thereof.

Owing to the above, that fueling in the ON state of the ignition key switch which is highly in danger of a fire etc. is rendered impossible, and the start of the engine in the state in which the fuel tank can be fueled or is being fueled is rendered impossible, whereby the safety of the fueling operation is enhanced.

PREFERRED EMBODIMENTS OF THE INVENTION

Figure 2:
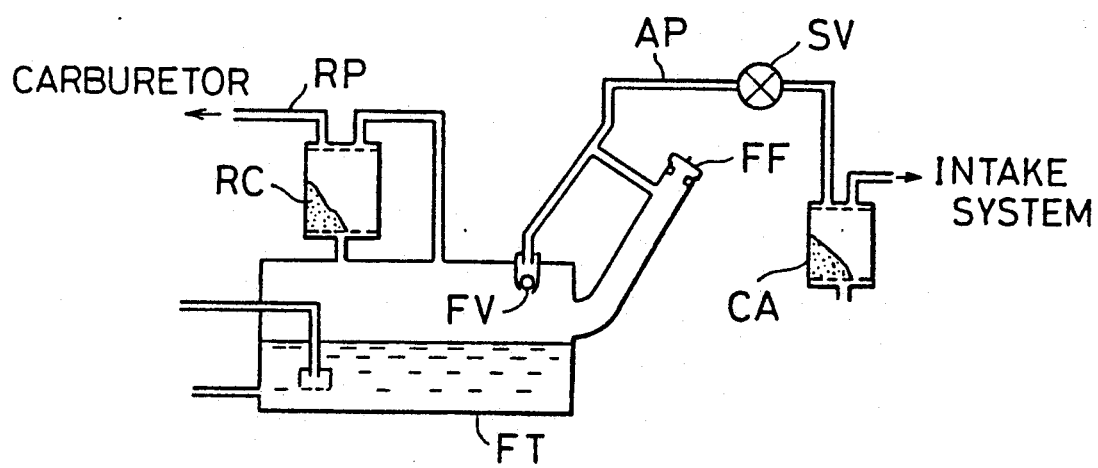
FIG. 2 is a piping diagram of a fuel supply system for a motor vehicle to which the present invention is to be applied.

FIG. 2 shows the fuel pipe arrangement of an automobile to which the present invention is to be applied. The arrangement has a fuel tank FT, a fuel flap FF which is provided on the inlet pipe of the fuel tank FT, a canister CA, and an air breather pipe AP by which fuel vaporized in the fuel tank FT is introduced into the canister CA or an intake system not shown. In the air breather pipe AP, there is interposed a solenoid valve SV which is opened in interlocking with the opening of the fuel flap FF when the fuel tank FT is to be fueled by opening the fuel flap FF, thereby causing the canister CA to adsorb the fuel vapor generated in the fueling operation. Besides, in a return pipe RP which extends from the float chamber of an unshown carburetor to the fuel tank FT, there is interposed a canister RC for running vapor recovery having hitherto been known, which adsorbs a fuel vapor generated in the fuel tank FT during the running of the automobile and thereafter returns the adsorbed fuel vapor into the intake system of the engine of the automobile. Shown at symbol FV is a float valve which blocks the air breather pipe AP when the fuel in the fuel tank FT has reached a prescribed level.

Figure 1:
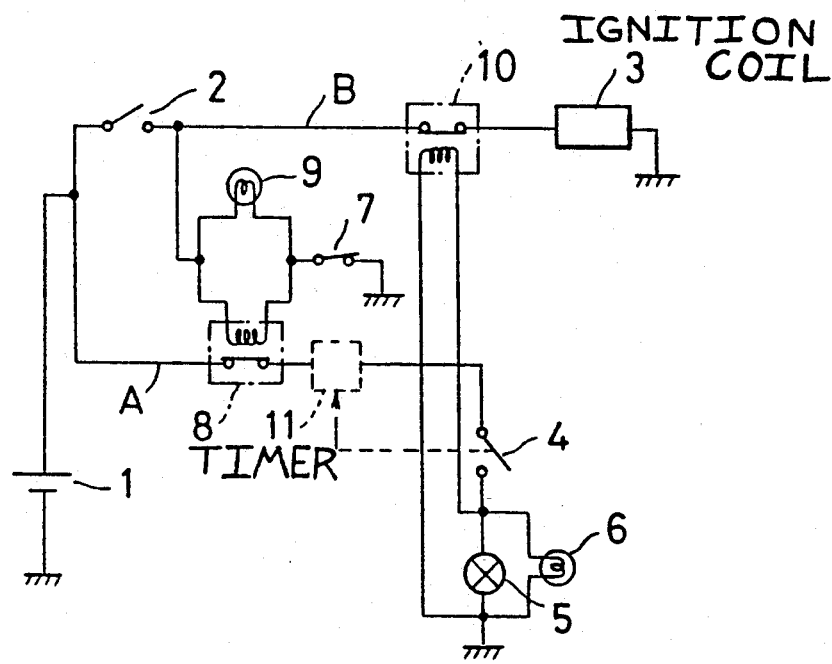
FIG. 1 is a circuit diagram showing an embodiment of the present invention.

FIG. 1 is a circuit diagram showing an embodiment of the present invention. The embodiment includes a power source 1, an ignition key switch 2, and an ignition coil 3. A fuel flap switch 4 is closed when the fuel flap of an unshown fuel tank is opened. Numeral 5 indicates a solenoid valve by which an air breather pipe for connecting the fuel tank and a canister not shown is brought into communication at closed state of the fuel flap switch 4. A fueling lamp 6 is connected in parallel with the solenoid valve 5. Further, the embodiment includes a boost switch 7 which is opened during the rotation of an engine not shown and which is closed during the stop of the engine. A first relay 8 of normally-closed type is interposed in a solenoid valve driving circuit A extending from the power source 1 to an earth through the fuel flap switch 4 as well as the solenoid valve 5. The first relay 8 is opened when both the boost switch 7 detects engine stoppage (and is thus closed) and when the ignition key switch is closed. An alarm lamp 9 is connected in parallel with the relay coil of the first normally-closed relay 8. Besides, a second relay 10 of normally-closed type is interposed in an ignition coil driving circuit B extending from the power source 1 to the earth through the ignition key switch 2 as well as the ignition coil 3, and a contact of the first relay is opened during the energization of the solenoid valve 5 driving circuit A.

Owing to the above, when the engine is stopped with the ignition key switch 2 is opened, the first normally-closed relay 8 is not energized, and its relay contacts remain closed. Therefore, when the fuel flap switch 4 is closed by opening the fuel flap, the solenoid valve 5 is actuated to open, and it brings the air breather pipe between the fuel tank and the canister into communication, thereby to permit fueling. Simultaneously, the fueling lamp is lit up, thereby to indicate the state in which the fueling is permitted.

In this case, even when the ignition key switch 2 is erroneously manipulated to close, the relay contacts of the second normally-closed relay 10 is immediately opened when the engine is started, and the ignition coil 3 is no longer energized. Therefore, the engine does not continuously run then the safety of the fueling operation can be secured.

Besides, in the engine stalling in which the engine is stopped in spite of the close manipulation of the ignition key switch 2, the boost switch 7 having detected the stop of the engine is closed to energize the first normally-closed relay 8 and to change-over the relay contacts to the open side thereof. Therefore, even when the fuel flap is opened to close the fuel flap switch 4, neither the solenoid valve 5 nor the fueling lamp 6 is energized. Thus, since the fueling lamp 6 is not lit up, it indicates the state in which the fueling is impossible.

Next, during the rotation of the engine based on the close manipulation of the ignition key switch 2, the boost switch 7 having detected the engine rotation is opened, and the relay contacts of the first normally-closed relay 8 remain closed. Therefore, when the fuel flap is opened to close the fuel flap switch 4, the solenoid valve 5 is actuated to open, and the fueling lamp 6 is lit up, thereby to permit the fueling. Herein, the second normally-closed relay 10 connected in parallel with the solenoid valve 5 is also energized to change-over the relay contacts to the open side thereof, so that the ignition coil 3 is deenergized to stop the engine. On this occasion, the boost switch 7 having detected the engine stop is closed to light up the alarm lamp 9 and to energize the first normally-closed relay 8 so as to change-over the relay contacts to the open side. Eventually, therefore, the actuation of the solenoid valve 5 is released to render the fueling impossible. The state in which the fueling is impossible, is indicated by the extinction of the fueling lamp 6.

In the above way, when the fuel flap is opened with the ignition key switch 2 manipulated to be opened, the solenoid valve 5 is actuated to open, thereby permitting the fuel tank to be fueled, and the state in which the fueling is possible is indicated by lighting up the fueling lamp 6. Thus, the safety of the fueling operation can be attained. On the other hand, when the fuel flap is opened to close the fuel flap switch 4 during the rotation of the engine based on the close manipulation of the ignition key switch 2, the solenoid valve 5 is actuated to open, thereby to establish the state in which the fueling is possible. At the same time, however, the second normally-closed relay 10 connected in parallel with the solenoid valve 5 is also energized to open the relay contacts and to stop the engine. The boost switch 7 having detected the stop of the engine is closed. Then, the alarm lamp 9 is lit up to indicate the stalling state of the engine. Also, the first normally-closed relay 8 is energized to open the relay contacts and to release the actuation of the solenoid valve 5, thereby to render the fueling impossible. Besides, the fueling lamp 6 is put out to indicate the state in which the fueling is impossible. Thus, the safety of the fueling operation can be attained.

Incidentally, the above embodiment has referred to the example of application to the fuel tank assembly as shown in FIG. 2 wherein the float valve FV is provided which blocks one end of the air breather pipe AP extending from the fuel tank FT to the canister CA when fuel contained in the fuel tank FT has arrived at the prescribed level. Instead of the float valve FV, however, a liquid level switch which is opened upon the arrival of the contained fuel at the prescribed level may well be interposed in series in the solenoid valve driving circuit A in FIG. 1 extending from the power source 1 to the earth through the first normally-closed relay 8, fuel flap switch 4 and solenoid valve 5.

As indicated by broken lines in FIG. 1, a timer 11 may well be interposed in series in the solenoid valve driving circuit A. The timer 11 close the circuit in interlocking with the ON operation of the fuel flap switch 4 or with the fuel flap opening manipulation of an opener switch which is provided in a car room and which can open the fuel flap by a remote control, and it open the circuit after the lapse of a predetermined time period, thereby to restrict the actuation time of the solenoid valve 5 within the predetermined time period. This measure can prevent the burning fault of the solenoid valve 5 when the closure of the fuel flap is carelessly forgotten.

As described above, according to the present invention, in a safety circuit for a fuel supply system of a motor vehicle, having a canister for adsorbing a fuel vapor generated in a fuel tank mounted on said motor vehicle, an air breather pipe connected between an upper portion of said fuel tank and said canister for replacing air when fuel decreases, a fuel flap provided on said fuel tank for opening and closing to fill, a solenoid valve interposed in said air breather pipe for breathing air into said fuel tank, and a key switch connected between a power source and an ignition coil for igniting to start an engine, there is provided the improvement of the safety circuit which comprises a fuel flap switch connected to said fuel flap for closing thereof when said fuel flap is opened and for opening said fuel flap switch when said fuel flap is closed; a driving circuit connected from said power source to a ground earth via said solenoid valve; a boost switch connected between said key switch and said ground earth for closing thereof when said key switch is closed and when said engine is stopped; a switch interposed in said driving circuit for opening thereof when said boost switch is closed; and a relay interposed between said key switch and said ignition coil for opening thereof when said solenoid valve is operated so as to improve safety fueling and to prevent said solenoid valve from burning. Moreover, the safety circuit further comprises a timer interposed between said fuel flap switch and said switch for closing thereof when said flap switch is closed and for opening after a predetermined time period so as to restrict an actuating time of said solenoid valve and to avoid burning thereof. Thus, the invention can bring forth great effects in practical use conjointly with the simple construction.

While the presently preferred embodiment of the present invention has been shown and described, it is to be understood that this disclosure is for the purpose of illustration and that various changes and modifications may be made without departing from the scope of the invention as set forth in the appended claims.

I claim:

1. A safety circuit for a fuel supply system of a motor vehicle which fuel supply system includes a fuel tank, air breather pipe connected to the fuel tank, a solenoid valve interposed in the air breather pipe and a fuel flap, said safety circuit including:
   a solenoid for opening and closing the solenoid valve;
   an ignition coil driving circuit connected from a power source to an ignition coil via a key switch for igniting an air-fuel mixture to start an engine;
   a fuel flap switch operatively connected to the fuel flap such that said fuel flap switch is closed when the fuel flap is open and such that said fuel flap switch is open when the fuel flap is closed;
   a solenoid driving circuit for driving said solenoid, said solenoid driving circuit connected to the power source and a ground via said solenoid and said fuel flap switch;
   a boost switch connected from said key switch such that said boost switch is closed when the engine is stopped;
   a first relay interposed between the power source and said fuel flap switch in said solenoid driving circuit for prohibiting current flow through said first relay when both said boost switch and said key switch are closed;
   a second relay interposed between said key switch and the ignition coil in said ignition coil driving circuit, said second relay prohibiting current flow to the ignition coil when said fuel flap switch is closed and said first relay is closed.

2. The safety circuit according to claim 1, further comprising:
   a timer interposed between said fuel flap switch and said first relay in said solenoid driving circuit for restricting an actuation time of said solenoid in order to prevent a burning out thereof due to the fuel flap not being closed within a predetermined time.

3. The safety circuit according to claim 1, further comprising an alarm lamp interposed between said ignition switch and said boost switch in parallel with said first relay for warning that the engine is stopped.

4. The safety circuit according to claim 1, further comprising a fueling lamp providing in parallel with said solenoid for indicating that fueling is possible.

5. A safety circuit for a fuel supply system of a motor vehicle, which fuel supply system includes a fuel tank for containing a fuel, an air breather pipe connected to the fuel tank, a fuel flap and a valve interposed in the air breather pipe, the safety circuit comprising:
   valve actuation means for opening and closing the valve;
   an ignition coil driving circuit serially connected to a power source, an ignition coil and a key switch;
   a fuel flap switch operatively connected to the fuel flap such that said fuel flap switch is closed when the fuel flap is open;
   a boost switch operatively connected to the engine such that said boost switch is open when the engine is running;
   a valve control circuit serially connected to the power source, fuel flap switch and valve actuation means;
   a first relay interposed in the valve control circuit for cutting off power to said valve actuation means when said key switch and said boost switch are closed so that the valve closes;
   a second relay interposed in said ignition coil driving circuit for cutting off power to the ignition coil when the valve is in an open condition.

6. The safety circuit according to claim 5, further comprising:
   a timer interposed in said valve control circuit for restricting an actuation time of said valve actuating means in order to prevent a burning out thereof due to the fuel flap not being closed within a predetermined time.

7. The safety circuit according to claim 5, further comprising:
   a fueling lamp connected in parallel to said valve actuation means for indicating a state in which fueling is possible.

8. The safety circuit according to claim 5, further comprising:
   an alarm lamp serially connected to said boost switch for indicating a stalled state of the engine.

9. A fuel supply system, comprising:
   a fuel tank;
   an air breather pipe connected to said fuel tank;
   a solenoid valve interposed in said air breather pipe;
   a fuel flap; and
   a safety circuit, said safety circuit including,
      a solenoid for opening and closing said solenoid valve,
      an ignition coil driving circuit connected from a power source to an ignition coil via a key switch,
      a fuel flap switch operatively connected to said fuel flap such that said fuel flap switch is closed when said fuel flap is open and such that said fuel flap switch is open when said fuel flap is closed,
      a solenoid driving circuit for driving said solenoid, said solenoid driving circuit connected to said power source and a ground via said solenoid and said fuel flap switch,
      a boost switch connected from said key switch such that said boost switch is closed when the engine is stopped,
      a first relay interposed between the power source and said fuel flap switch in said solenoid driving circuit for prohibiting current flow through said first relay when both said boost switch and said key switch are closed,
      a second relay interposed between said key switch and the ignition coil in said ignition coil driving circuit, said second relay prohibiting current flow to the ignition coil when said fuel flap switch is closed and said first relay is closed.

10. The fuel supply system according to claim 9, further comprising:
    a timer interposed in said solenoid driving circuit for restricting an actuation time of said solenoid in order to prevent a burning out thereof due to said fuel flap not being closed within a predetermined time.

11. The fuel supply system according to claim 9, further comprising:
    a fueling lamp connected in parallel to the solenoid for indicating a state in which fueling is possible.

12. The safety circuit according to claim 9, further comprising:
    an alarm lamp serially connected to said boost switch for indicating a stalled state of the engine.

* * * * *